(12) United States Patent
Harms et al.

(10) Patent No.: US 9,329,411 B2
(45) Date of Patent: May 3, 2016

(54) MOUNTING INTERFACE FOR EYEWEAR

(71) Applicants: Donn K. Harms, Del Mar, CA (US); Patrick Hussey, Boynton Beach, FL (US)

(72) Inventors: Donn K. Harms, Del Mar, CA (US); Patrick Hussey, Boynton Beach, FL (US)

( * ) Notice: Subject to any disclaimer, the term of this patent is extended or adjusted under 35 U.S.C. 154(b) by 40 days.

(21) Appl. No.: 14/187,136

(22) Filed: Feb. 21, 2014

(65) Prior Publication Data

US 2014/0232980 A1 Aug. 21, 2014

Related U.S. Application Data

(60) Provisional application No. 61/767,678, filed on Feb. 21, 2013.

(51) Int. Cl.
*G02C 1/00* (2006.01)
*G02C 11/00* (2006.01)

(52) U.S. Cl.
CPC ............... *G02C 11/10* (2013.01); *G02C 11/00* (2013.01)

(58) Field of Classification Search
CPC ........ G02C 11/00; G02C 11/02; G02C 11/04; G02C 11/06; G02C 11/08; G02C 11/10; G02C 11/12; G02C 5/02
USPC ........................... 351/158, 124, 133; 2/209.13
See application file for complete search history.

(56) References Cited

U.S. PATENT DOCUMENTS

| 4,457,461 A | * | 7/1984 | Docking et al. | 224/181 |
| 2006/0268217 A1 | † | 11/2006 | Teng | |
| 2010/0073262 A1 | * | 3/2010 | Matsumoto | 345/8 |
| 2010/0103076 A1 | * | 4/2010 | Yamamoto | 345/8 |
| 2012/0075571 A1 | † | 3/2012 | Silver | |
| 2012/0105740 A1 | † | 5/2012 | Jannard | |

* cited by examiner
† cited by third party

*Primary Examiner* — Huy K Mai
(74) *Attorney, Agent, or Firm* — Donn K. Harms

(57) ABSTRACT

A mounting interface system is provided and is adapted for the engagement of any of a plurality of electronic components with eyewear such as eyeglasses and goggles. The system employs a mounting component on the eyewear which is engageable and adjustable with a complimentary mount on any of a plurality of said electronic components.

15 Claims, 5 Drawing Sheets

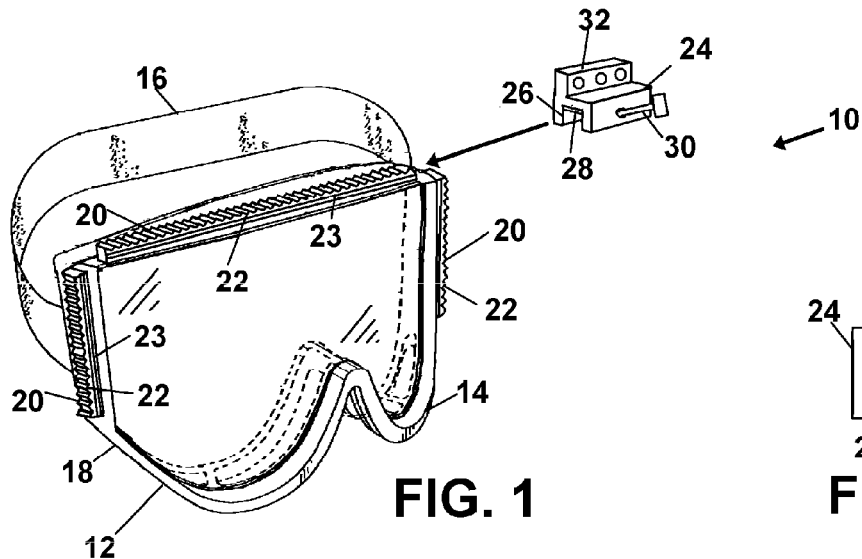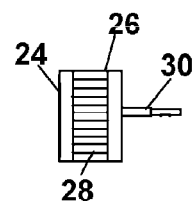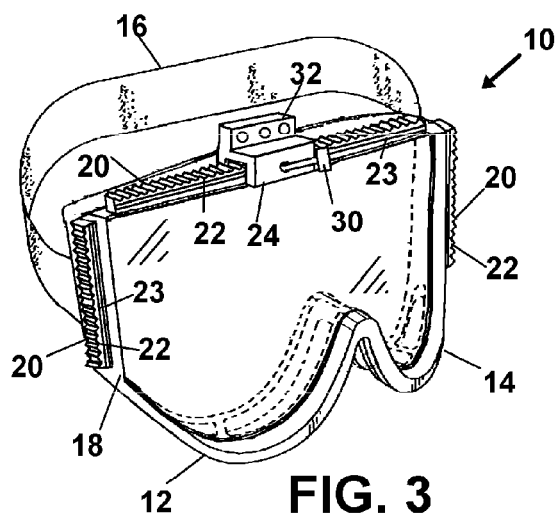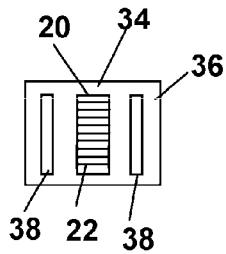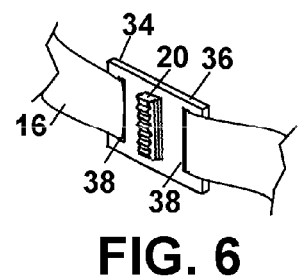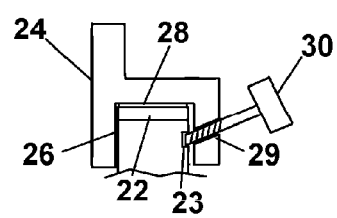

MOUNTING INTERFACE FOR EYEWEAR

This application is a Nonprovisional Application of U.S. Provisional Application No. 61/767,678 filed on Feb. 21, 2013, and is incorporated herein in its entirety by this reference.

BACKGROUND OF THE INVENTION

1. Field of the Invention

The present invention relates generally to human eyewear such as corrective and protective eyewear and the like for instance sunglasses, eyeglasses, goggles, eye shields, and goggle and eyeglass hybrids. More specifically, the invention relates to goggles or similar protective eyewear which is configured with means to removably engage and secure auxiliary components for employment by the user such as work and tactical related devices, including but not limited portable lights, cameras, microphones, and transmitters and antennas for wireless transmission and reception.

2. Prior Art

Military and law enforcement alike depend on their weapons and other tactical equipment when engaging in dangerous or unknown situation. A primary protective component employed by military, police, tactical, and many industrial and medical workers, is protective eyewear to prevent eye injury and in many cases improve vision of the area of interest.

Aside from weapons and tools, and protective eyewear, other tactical equipment employed by such users can include flashlights, audio and video recorders, GPS components, and RF and other wireless communication devices. Such types of auxiliary equipment are often carried by hand, or as an accessory engaged on the users body, tool, or weapon.

For example, a flashlight may be carried in a side holster, or in other cases may engaged to a firearm in a manner like a bayonet, such that the light illuminates the area in the firing line of the firearm in a ready position. However, the area in front of the firearm, may frequently not be the primary area of viewing interest for the user who must deal with darkness-inhibited vision. Consequently one or a plurality of secondary lighting components is desirable and may be necessary. Such a need for secondary lighting and carrying such can be an awkward requirement to implement at best. This is because in a tactical or military or work situation, the user will generally be holding a weapon in one or both hands which conventionally takes two hands to operate in a professional and accurate fashion.

In cases when a weapon is not being used, or in cases where medical, construction, or industrial workers where tools or instruments require the users hands, the user will still lack a free hand for carrying and aiming a light. Consequently such users are generally unable to employ needed auxiliary or tactical lighting and other equipment or accessories required with their tools and instruments. Consequently they will be operating at a level below that which a professional would prefer. As a conventional solution, there is seen in prior art many attempts to alleviate the needed to carry tactical illumination equipment by hand, and instead mount them on other locations.

U.S. Pat. No. 7,722,205 B2 to Kim teaches a light assembly adapted for engagement to the side of a helmet or other headgear. The device to Kim is intended to be dipped or otherwise securely engaged to the brim of a helmet. As could be imagined, employment of the device of Kim requires the user to wear a helmet and is therefor limited in use to helmet wearing occasions.

U.S. Pat. No. 7,997,724B1 to Hsu teaches an eyewear device having a lighting apparatuses engaged to the temple portions of the eyewear frame. However, as a downfall, the lighting apparatuses are rigidly affixed to the temple portions, and neither lighting components for different occasions nor positional changes can be made.

This and numerous other similar prior art teachings which provide means to mount or otherwise engage tactical equipment or tools, in a hands-free manner simply fall short. As such there is a continuing and unmet need for an improved tactical equipment mounting system for auxiliary lighting and other components. Such a system should be employable in combination with conventionally used equipment by military, tactical, and professional users, on eyewear which is conventionally employed to protect or enhance user vision such as goggles and protective eyewear. Further, such a device should provide a means to enhance the performance of both their vision and the employment of their other carried gear due to the provided vision enhancement and freeing of hands from holding such lighting components. Such a system should provide the user the ability to to customize both the actual light emitting device or devices as well as their positions and projection area relative to the face of the user. Further, such a system of lighting components and mounting should be provided individually and in kit form to allow for customization of the position of one or a plurality of lighting and auxiliary devices upon user headwear such as goggles or eyeglasses and shields, as required and desired for their individualized standards and preference.

SUMMARY OF THE INVENTION

The device and system herein disclosed and described provides a solution to the shortcomings in prior art and achieves the above noted goals through the provision of a tactical and operational equipment mounting and engagement system, in operative engagement or integrally formed with protective eyewear such as goggles and eyewear shields and is employable as well as conventional eyeglasses. The system provides one or a plurality of mounts or mounting rails which are operatively positioned on or around the frame of a goggle. The mounting rails may be small and individualized to support specific tactical components, or they may be configured as a mounting rail or position for any of a plurality of mounted devices having a mating engagement component. The mounting positions or rails as noted may be individual mounting seats, or they may be elongated and providing for real time translation or repositioning or positional adjustment of the engaged lighting components, antennas, or other tactical gear to suit a current task or a user's individual requirements. The individual components may be provided as individual items or may be provided in kits of a plurality of mountable components each having a mating mounting component and individually physically matched to the task or current criteria.

For instance in a tactical employment, groups or teams of military or police personnel will generally have individual positions to maintain relative to other members of the group, during movement of the team in a tactical operation. Leading members of the team may which to engage particular lighting or auxiliary components to themselves, and to individual members of the group in relation to their positioning during movement and operations. Thus for group members positioned on respective left, right, forward, and rear positions the members themselves or the leader, can position different tactical components on each individual, or the same tactical components in different positions on the eyewear of each individual, in order to maximize lighting, wireless transmissions, and other needs during different tactical operation.

For example a high intensity flashlight may be desirable mounted on the right side or center of the goggle for one team member, in anticipation of the ultimate moving and static positioning relative to the others in the group. Or, positioning of the type of tactical components engageable to the mounting rail or positions, by each member, may require a desired different position by different users. For example wireless transmitters and antennas or light transmission components may work best with trailing members who are closer to a building opening. Cameras for image capture and/or transmission, may best be mounted to forward center members with adjacent members providing lighting on both sides and centered. In operations using IR wireless to maintain RF silence, rear projecting IR or light based transmission devices for front members of the group, can feed and daisy-chain audio and/or video transmissions to rearward positioned members in real time. Each member rearward of the next would both receive and retransmit the light based communication signal rearward to the last member who may be transmitting to an RF or light based receiver sending the signal to a remote location.

The system herein through the provision of one or a plurality of mounting rails or brackets, each of which are configured for removable and/or adjustable engagement with cooperatively engageable configured accompanying tactical components, devices and equipment. Such can include but is not limited to lighting components, video cameras, RF and IR and light based transceivers, and directional or specialized broadcast antennas for communication amongst the group and/or with remote locations. All such tactical components, where individual or in kit of such components, are fitted with a mounting engagement which is complimentary to that of the rail or mount, for operative removable engagement and real time positionable engagement of the chosen component, to a chosen position upon the eyewear-positioned mounts or mounting rails. The cooperative mounting means between eyewear such as a goggle, and the chosen engaged tactical or operational components, allows the user to customizably position each device having the cooperative mount, at a position on the eyewear or goggle at any chosen mounting position upon any mounting rail as they desire.

It should be noted that a number of currently preferred cooperative mounting rails and cooperative mounts are shown herein. However those skilled in the art will realize on reading this disclosure, that other configurations and cooperative engagements can be employed, and all such cooperative engagements between goggles and tactical or operational components, which allow for mounting multiple devices thereon in multiple user-chosen positions, as would occur to those skilled in the art, are considered within the scope of this patent.

In one preferred mode of the system herein, the mounting rail and mating equipment mount form a means for mounting which includes complimentary toothed ridge portions or projections. The individual sequential ridge portions provide a means for cooperative registered engagement with any of a plurality of other components, and means for translation of the mounted component at will without a fear of loss thereof from dismount. In use, a cooperatively configured mount, operatively positioned upon the auxiliary components, will easily engage with the rail or member projecting from the eyewear or goggle like a saddle. Securement is preferably provided via a means for releasable compressive engagement such as a thumb set screw, or spring or other biased gripping component.

However in other modes securement of the equipment mount to the rail mount can include spring loaded, frictional engagement, snap fits, or other means for secured removable engagement which provides for an easy registerable engagement of the component to a mount having the complimentary surface to engage the securement device on the component. In general the mounting means and means for removably engagement are configured to provide the user with the ability to engage and disengage, and/or position and reposition the auxiliary or tactical device 'on-the-fly'. Such should be done without the fear of a dismount, even in a darkened environment thereby allowing adjustment through a tactile contact with the mounting component and movement thereof.

In another particularly preferred mode of the invention, the mounting component for auxiliary equipment or tactical components and the like, employ one or a plurality of grooves extending the length of at least one sidewall. The cooperatively configured groove engage over the rail projecting from the goggle in a saddled type engagement. The engagement preferably includes one or a plurality of complimentary tongue portions which communicate with the grooves in a registered engagement. In this mode securement can be provided by a set screw, frictional engagement, releasable spring loaded engagement, or other means for releasable fixed securement.

In yet another particularly preferred mode, employable with or without the projecting rail from the goggle, the system herein includes a secondary mount adapted for engagement to the strap or band portion of the goggle. The strap of the goggle is preferably woven through slots or grooves on the auxiliary mount securing the mount with the strap in a position on the side of a user's head when the goggle is worn. The mount additionally includes one or a plurality of projecting mounting rail portions cooperatively engageable with any of the noted auxiliary components herein or as would occur to those skilled in the art.

The goggle and mounting rail of the present invention can be formed as a unitary OEM product or may be engaged to the goggle via other means such as adhesive, sonic welding, or the like. Further, in use, the device can be sold as a kit, providing the user with the goggle having projecting cooperative mounting rail portions, and a plurality of tactical or auxiliary equipment components having a complimentary mounting means for engagement to projecting rails. The user can then customizably position the tactical device or auxiliary component of their choosing, to the goggle, in any of a plurality of available positions on the exterior thereof. The tactical or auxiliary component selected, can be easily changed, interchanged and re-positioned as needed.

In still yet another particularly preferred mode, the device herein employs a system for removable engagement of one or a kit of illumination components to goggles and other eyewear allowing the user, and the group if employed such, to customize illumination emitted from their eyewear for a tactical and/or practical utility. It is preferred that the illumination components are configured to direct light away from the goggle lens, for eliminating glare and improving illumination of the wearers line of sight when in use. As noted, the system herein allows for groups of users to position their lighting components to best serve themselves and the vision of the group members when their positional relation to other members during movement is taken into consideration.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and mayor may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and mayor may not be present depending upon whether or not they affect the activity or action of the listed elements.

It is an object of the invention to provide a tactical equipment mounting system for goggles or protective eyewear, with a variety of tactical or auxiliary components which might be employed during tasks by the user.

It is another object of the invention to provide a mounting device and system wherein the user can change or reposition a particular piece of tactical equipment on the fly.

It is yet another object of the invention to provide a kit of tactical equipment mounts which can be sold separately or in combination with a goggle portion, such that the user can then customizably position auxiliary tactical equipment and components of their choosing, to the goggle, in customizable positions.

A further object of the invention is the provision of components which have a common mount configured for cooperative registered engagement to rails or mounts on or projecting from eyewear.

Yet another object is the provision of such a device, where a group of users may position components to their eyewear, based on their anticipated position in the moving or stationary group during use.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 1 shows a view of a particularly preferred mode of the device consisting of a protected eyewear goggle having preferred rail mounts with locking ridges engaged about the side and top edges of the goggle frame, also shown is a preferred tactical equipment mount component having LED light bar depicted in a disengaged position.

FIG. 2 shows a bottom view of the equipment mount component of FIG. 1 detailing the complimentary locking ridge portions employed for registered engagement with the rail mounts when in an as used engaged position.

FIG. 3 shows a view of the mode of the device of FIG. 1 in the as used engaged position.

FIG. 4 shows a front view of a particularly preferred component of the device being a strap or band mounting component also having a rail mount.

FIG. 5 is a side view of the component of FIG. 4.

FIG. 6 is a view of the component of FIG. 4 in the as used position engaged with the band or strap of the goggle.

FIG. 7 depicts a side cross sectional view of the component mount in secured registered engagement with the rail mount.

DETAILED DESCRIPTION OF THE PREFERRED EMBODIMENTS OF THE INVENTION

Figure 8:
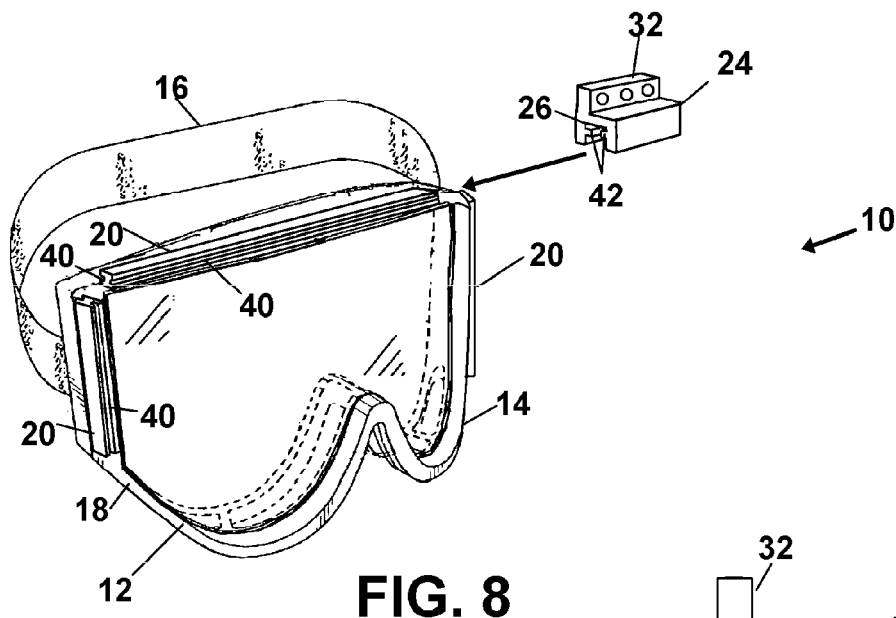
FIG. 8 shows a view of another particularly preferred mode of the device consisting of a protected eyewear goggle having preferred rail mounts with groove portions engaged about the side and top edges of the goggle frame, also shown is a preferred complimentary tactical equipment mount component depicted in a disengaged position.

Now referring to drawings in FIGS. 1-20, wherein similar components are identified by like reference numerals, there is seen in FIG. 1 an elevated view of a particularly preferred mode of the tactical mounting system for employment with one or a plurality of tactical or auxiliary components, configured for operative removable and repositionable engagement upon cooperative individual or elongated mounts on eyewear such as goggles or eyeglasses or protective eyeshields. The device 10 is shown primarily of goggles 12 having a frame with lens portion 14 and biasing strap or band portion 16. However, the goggle 12 style eyewear which is currently depicted includes a unitary lens, and particular shape, it is within the scope of the invention that the mounting system described herein can also be employed on goggles having a dual lens structure, and goggles of any shape and size as would occur to those skilled in the art, and is anticipated, as well as on other types of eyewear which engage over and/or around the eyes on the head of a user.

It is a primary object of the present invention to provide a mounting interface device and system for eyewear and shown as goggles 12 which will provide a user with the means to secure and removably engage any one or plurality of tactical devices or auxiliary components, desired for employment by the user, to a goggle 12 or other eyewear having the mounting system herein. As such it is to be noted that the means of mounting depicted herein and described shortly are provided merely as an example a manner in which to achieve the mounting interface between a goggle and one or a plurality of other components. Thus, upon reading this disclosure, those skilled in the art may recognize various other means to provide an interface for removable engagement of tactical devices and/or auxiliary components to a goggle, which are considerably or slightly different those disclosed, are considered within the scope and intent of the goggle interface invention herein, and are anticipated within the scope of this patent.

The device currently achieves the removable and repositionable mounting interface, for a registered engagement between auxiliary components and/or tactical equipment with eyewear, through the provision of a mounting system employing projecting or recessed mounting rails positioned on eyewear such as a goggle body, and complimentary configured component mounts which allows for real time engagement, disengagement, and repositioning of a particularly piece of tactical equipment or auxiliary component from a group of auxiliary components, to a registered fixed but changeable position. Such components can include but are not limited to, LED lights, audio/video cameras, audio or video recorders, and wireless transmitters or transceivers including RF and light-based wireless communications.

As is shown, one or a plurality of mount rails 20 or projections, are positioned on the eyewear to any desired position about the peripheral edges 18 of the eyewear such as the depicted goggle frame 14, shown herein at the side edges and top brow edge. It must be noted that although not shown, it is within the scope of the device 10 and system herein, that the mounting rails 20 providing the goggle and auxiliary component interface can be employed about the entire peripheral edges of the goggle frame 14, or in shorter or longer multiple positions thereon, as is therefor not considered limited by the depictions herein. The mounting rails 20 can be formed as a unitary structure with the goggle 12 such as an OEM production device, or the mounting rails 20 can be engaged after the goggle 12 is manufactured via adhesive, sonic or other welding or other means. Further, the system could be reversed with rails projecting from the components which engage into slightly elastic slots formed in the eyewear body however the projecting rail is easier to employ with just tactile senses.

In accordance with one preferred mode, the mounting rails 20 include a plurality of locking ridges 22 and at least one groove portion 23, which are disposed on orthogonally opposed sidewalls and extend the length of the rail 20. In use, the ridges 22 provide a mounting interface in the form of a means for secured registered engagement with a mount component 24 operatively positioned upon any component or tactical equipment or other device for which a user wishes to operatively engage and position on the goggle. The mount component 24 shown further in the bottom view of FIG. 2, is depicted having a channel 26 and complimentary locking ridges 28 therein such that the mount component 24 engages over the mounting rails 20 in a type of saddled engagement. The mount component 24 also includes a means to maintain a fixed but removable position on the ridge which is shown as a thumb set screw 30 which is employed as a means to secure the component 24 onto the rail 20 (shown later in the exemplary view of FIG. 7). Of course other such means to maintain positioning of the engaged mount and rail may be employed and are anticipated within the scope of this invention. For instance a biased pin or clamp which is releasable by user operation.

The currently depicted equipment mount component 24 may be engaged to a preferred LED light bar 32 for instance or other components the user may wish to have goggle-engaged and positioned. Shown in the as used engaged position of FIG. 3, the light bar 32 will provide a user with forward projected lighting on the right or left side of their head, as needed in the direction the user turns his head. (power source, such as a battery not shown but would be engaged). Further, the user can easily and swiftly disengage the mounting component 24 from the rail 20 via release of the stop means such as the depicted thumb screw 30 or the noted push-button, or rocker of FIG. 13a or other finger operated means for fixing the position of the mounting component to a rail or mount. The user can later easily reposition the component by translation along the top rail or to any of the side rail mounts as needed. Additionally, as will be shown later, the user can engaged other types of auxiliary components or tactical equipment employing a goggle-component interface such as the rail 20 and complimentary mounts 24 shown herein.

To allow the user to engage additional tactical devices, or auxiliary components, there is seen in FIG. 4 and FIG. 5 front and side views respectively of a particularly preferred band or strap mount component 34. The strap mount component 34 has a substantially planar body 36 employing one or a plurality of slotted apertures 38 extending there though and providing a means for engagement to the strap 16 of the goggle 12. As shown in the as used position of FIG. 6, the goggle strap 16 is threaded or otherwise engaged through the apertures 38 of the component 34 in a manner similar to a buckle.

The component 34 includes an interface for removable engagement between the component and an auxiliary component or tactical component in the form of a mounting rail 20 engaged thereon. A user can engage a tactical device or auxiliary component having the cooperative mounting component 24 in manner similar to that shown in FIG. 3. It must be noted that the mounting rail 20 on the strap mount 34 can instead be disposed in a horizontal fashion as is not to be considered limited to the depiction shown.

FIG. 7 shows an exemplary side cross sectional view of the current particularly preferred mounting rail 20 and equipment mount 24 in a secured as used position. As mentioned, the equipment mount 24 engages over the rail 20 in a type of saddled engagement wherein the locking ridges 22, 28 provide a registered engagement thereon and prevent translational movement of the equipment mount 24 relative the rail 20. Further, as can be seen, means for removable secure positioning is shown provided by the thumb screw 30 which extends through a threaded aperture 29 on the mount 24 wherein the distal end of the screw 30 can be tightened into the groove portion 23 of the rail 30. This will provide a means for secured engagement of the mount 24 thereon. Therefor, by simply unscrewing the thumb screw 30, the user can easily reposition or disengaged the equipment mount 24 as desired. Of course a spring biased finger releasable securement or other releasable securement may also be employed.

Figure 9:
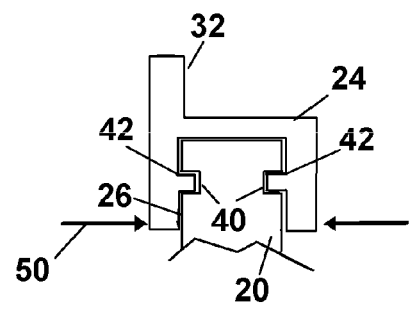
FIG. 9 depicts a side cross sectional view of the component mount of the mode of the device of FIG. 8 in secured registered engagement with the current preferred rail mount having groove portions.

As another example of a mounting rail system providing the goggle and component interface through means for removable engagement of a tactical or auxiliary component in accordance with another preferred mode of the invention shown in FIG. 9. As depicted, device 10 employs mounting rails 20 having at least two opposing groove portions 40 extending along the length such that the rail 20 is formed like an I-beam. In use, the grooves 40 provide a means for registered engagement with the tactical equipment mount component 24.

In FIG. 9, the equipment mount component 24 is shown again having a channel 26 and now having complimentary protruding tongue portions 42 therein which register in an engagement with the grooves 40 of the rail 20. Again the mount component 24 positioned on any tactical or auxiliary component desired for mounting to the goggle, engages over the mounting rails 20 in a type of saddled engagement however is initially engaged by sliding the mount 24 in from the side.

For this mode, the side wall portions of the mount 24 which define the channel 26 may be formed to exert and inward biasing force 50 on the rail 20 such as to provide secured frictional engagement thereon. As such in use, the user may simply slide the mount 24 to the desired position and the frictional biasing force 50 will provide a means to maintain secured engagement. It must be noted however that the currently shown mount component 24 may instead include a thumb set screw 30 as shown in the previous mode for providing a means to secure the component 24 onto the rail 20, and is anticipated.

Figure 10:
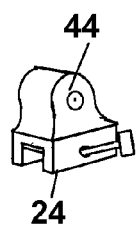
FIG. 10 shows a view of another particularly preferred tactical equipment mount component employing a video and/or audio communication and/or recording device such as a video camera.
Figure 11:
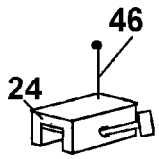
FIG. 11 shows a view of yet another particularly preferred tactical equipment mount component employing a radio frequency and/or optical transmitter or transceiver.

The disclosed invention provides a novel mounting device and system for goggles which allows a user to easily and swiftly engage a piece of tactical equipment to the goggle. The device is especially well adapted for employment by law enforcement or military agency where the use of tactical equipment is widely known and to do so in a hands-free manner is desired. The tactical equipment mounting component 24 has been shown in the preferred modes employing an LED light bar 32 however it is within the scope of the invention that the mount 24 can include any known piece of equipment suitable for the intended purpose and is anticipated. Further examples are shown in FIG. 10 and FIG. 11 showing the mounting component 24 having a video/audio recorder 44 or capturing device, or a wireless Light-based or RF transceiver 46 respectively. These and other tactical device can be provided in a kit to the user such that the user can then customizably engage the tactical device (or devices) of their choosing to the goggle.

Figure 12:
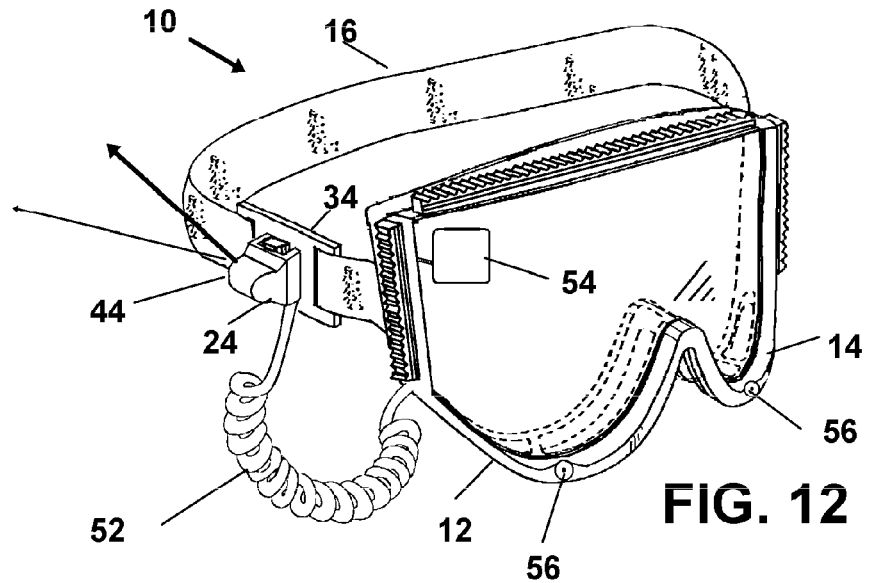
FIG. 12 shows another preferred mode of the invention employing a rear view camera and display means positioned on the lens of the eyewear.

FIG. 12 shows yet another particularly preferred mode of the device 10 with a mounting component 24 engaged to the strap mount component 34 having a rear facing video/audio recorder 44 or capturing device. The recorder 44 may be wired 52 or wireless engaged to a display means 54 mounted on the lens of the goggle 12. The display means 54 can be an image which is projected in real time onto the lens to be viewable by the wearer to show rear view images captured by the rear facing recorder 44. Further the display means 54 can include a material or coating to better render projected images.

Alternatively the recorder 44 can be selectively mounted as a front view camera simply by a change in mounting orientation, or similarly on the weapon or other auxiliary equipment employed by the user to view around corners or other hard to see or dangerous environments. The recorder/camera 44 may project black and white, IR, or low lux images to aid the user in enhanced viewing. Further, such characteristics may be switchable by the user in real time depending on the desired situation.

In this mode, the lens frame 14 of the goggle 12 may additionally include built in LED lights 56. This will essentially free up the rail 20 to allow the user to employ other pertinent tactical equipment. The LED lights 56 are preferably battery powered (not shown)

Figure 13:
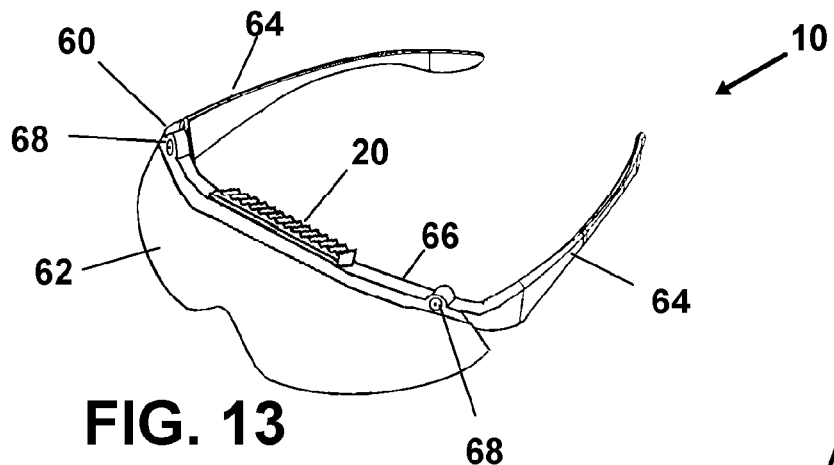
FIG. 13 depicts still another mode of the invention employing shield type eyewear.

FIG. 13 shows still another particularly preferred mode of the invention comprising a 'shield type' protective eyewear 60. The shield type eyewear 60 conventionally includes a unitary lens 62 engaged to a bridge portion 66 and temple portions 64. This mode of the device 10 additionally includes a mounted rail 20 engaged to the bridge portion 66 which can employ any of the preferred mounts previously disclosed. There is additionally included built in LED light components 68 which may be battery powered (not shown).

Figures 13A, 14:
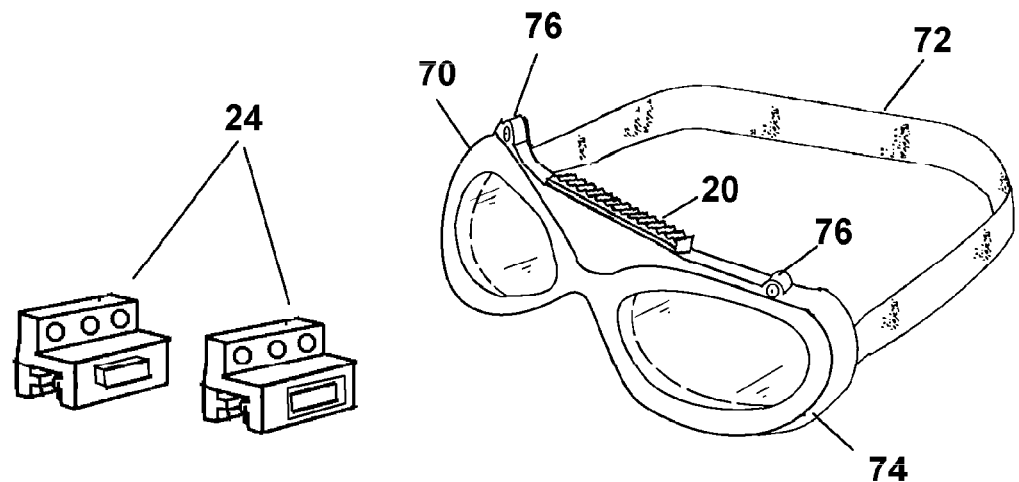
FIG. 13a shows a rocker-engaged and push-button engaged mode of mount components to convey that other means for removable biased compressed engagement can be employed.
FIG. 14 shows yet another preferred mode of the invention employing goggle hybrid type eyewear.

FIG. 13a shows a rocker-engaged and push-button engaged mode of mount 24 components to convey that other means for removable biased compressed engagement can be employed. In use a spring or other biasing means could hold a compressive pin against the rail which would be released by pushing or rocking the button, and re-engaged through opposite action.

FIG. 14 shows still yet another particularly preferred mode of the invention employing a goggle hybrid type protective eyewear 70. The hybrid type eyewear 70 include conventional goggle band portion 72 engaged to the eyewear frame 74 for engagement to the wearers head. This mode of the device 10 also includes rail 20 and built in LED light components 76.

Figure 15:
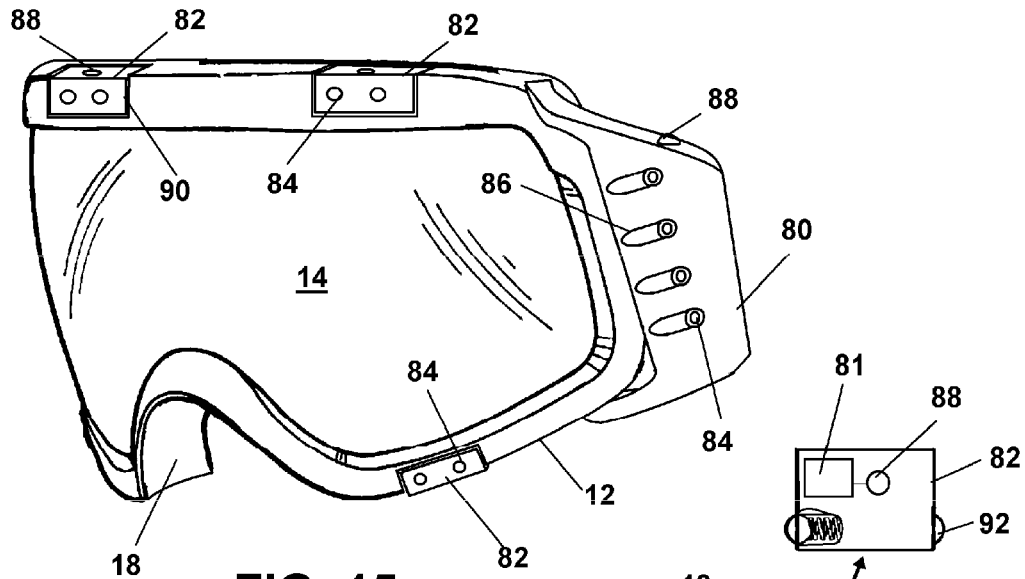
FIG. 15 shows another mode of the goggle employing a system for removable engagement of illumination components.
Figure 17:
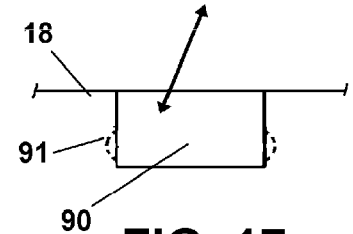
FIG. 17 shows a detailed view of a preferred spring ball plunger and detent system employed as the means for removable engagement of the pod illumination components.
Figure 16:
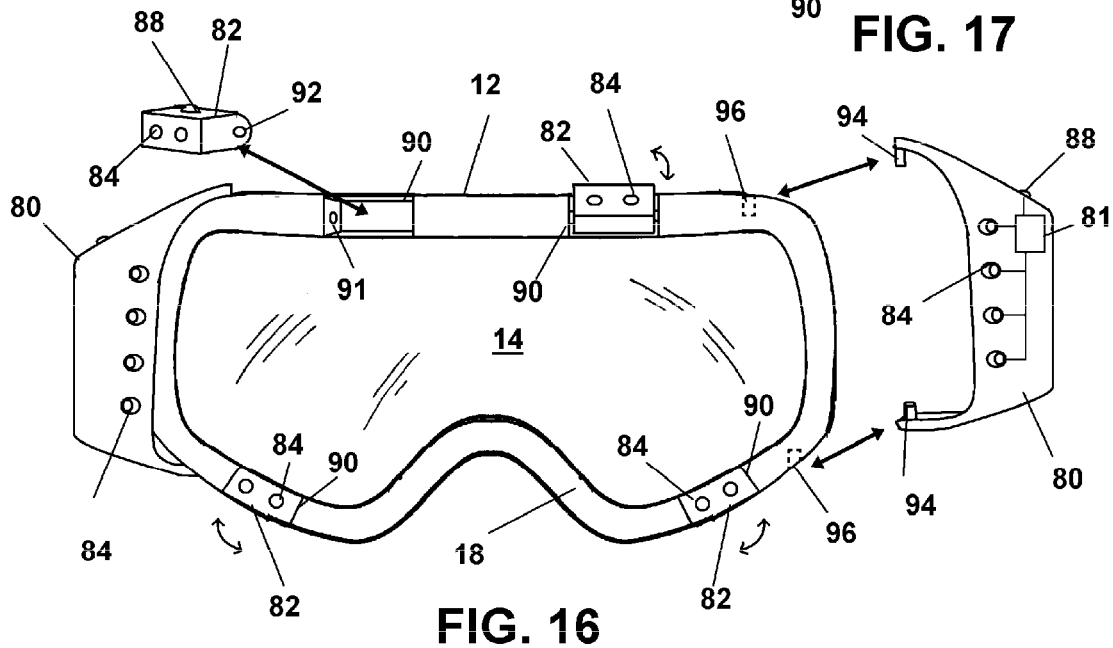
FIG. 16 shows a front view of the goggle of FIG. 15.

FIG. 15, FIG. 16, and FIG. 17 show another preferred mode of the device 10 providing a system for removable engagement of illumination components 80, 82 to goggles 12 and other eyewear. In the current mode, one or a plurality of a first preferred illumination component 82 are provided as individual pods which are engageable within receiving cavities 90 disposed along the peripheral edge 18 of the goggle 12. The illumination components 82 include one or a plurality of light sources 84, such as LED's other lighting means, including an on/off button or switch 88 which are powered by an onboard battery 81. The battery 81 can be replaceable within a battery compartment (not shown) or may be rechargeable through conventional charging techniques. However in other modes it is noted that the illumination components 82 can be electrically engageable to a power source means engaged to the goggle 12, such as a wire connector.

Preferred means for removable engagement include rotatable mating fasteners which will allow the user to quickly and easily replace the illumination components 82 as desired, and rotate them to the desired viewing angle. Shown in FIG. 17, is a preferred spring ball plunger fastener 92 and detent 91 system which is especially preferred mode of the mating fasteners providing the means for removable and rotatable engagement. Currently shown, the ball plunger fastener 92 is employed on the illumination components 82 and the detents 91 are disposed within the cavity 91, however it is noted that these locations could be switch as deemed suitable by the designer.

Further, it is anticipated that other means for removable engagement envisioned by those skilled in the art may also be employed. This may include magnetic fasteners, friction fit fasteners, clips, snaps, as well as other deemed suitable for the intended purposes. Still further, other modes of the device 10 are envisioned wherein the illumination component 82 are permanently and rotatably engaged within the cavities 90.

Also shown are outrigger type illumination components 80. The outrigger components 80 preferably removably engage to the sides surfaces of eyewear such as eyeglasses, eyeshields, or goggles 12, and employ snap fasteners 94 for engagement with receiving cavities 96 located on the peripheral edge 18 of the goggle 12 as shown. Again, however, it is noted and anticipated that other means for removable engagement, or fixing the position on the rail or mount, may be employed, including but not limited to magnetic fasteners, friction fit fasteners, clips, or snaps.

The outrigger illumination components comprising one or a plurality of light sources 84, such as LED's or other lighting means, including an on/off button or switch 88 which are powered by an onboard battery 81. Again, in other modes it is noted that the illumination components 80 can be electrically engageable to a power source means engaged to the goggle 12, such as a battery pack engaged to the goggle 12 and employing a wire connector.

Further, the outrigger illumination components 80 include channel guides 86 communicating with each light source 84. The channel 86 can be in the form of a elongated concave recessed cavity formed in the surface of the component 80 which extend from the light source 84 and which provide a means for directing the illuminated light forward and away from the lens 14 thereby reducing glare experienced by the wearer.

In all modes of the device 10 the quantity, spacing, and location of the light source 84 on the illumination components 80, 82 can be varied as determined suitable by the designer for example for varying the light intensity or for aesthetic purposes. Further, the light source type can be varied to suit a desired need, such as LED's, spot lights, colored lights for signaling, infrared lights, UV lights, as well as others which may be recognized by those skilled in the art.

Figure 18:
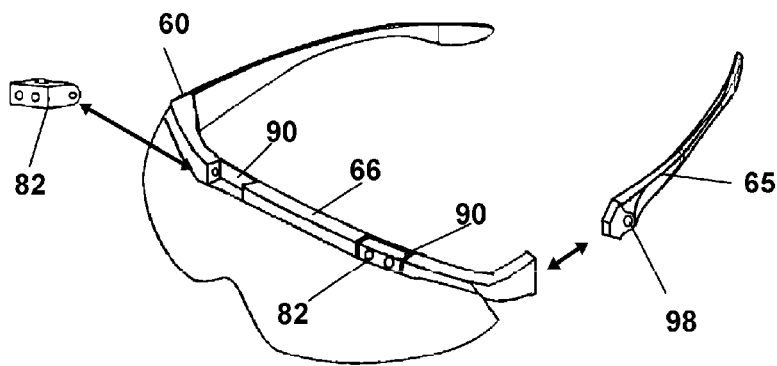
FIG. 18 depicts still another mode showing shield type eyewear employing the system for removable engagement of illumination components.

FIG. 18 shows another particularly preferred mode of the invention employing the current system for removable engagement of illumination components 82 comprising a 'shield type' protective eyewear 60. The shield type eyewear 60 includes the bridge portion 66 having one or a plurality of receiving cavities 90 for removable engagement with the pod illumination components 82. Additional utility in system for removable engagement of illumination is provided through one or both temple portions 65 also being removably engageable to the shield eyewear 60 as shown. The removable engageable temple portions 65 and bridge 66 can include suitable mating fasteners including snap fits, fiction fit fasteners, magnetic fasteners, or other suitable fastener means to facilitate removable engagement of the temple portions 65 from the rest of the eyewear. The temple portions 65 include light sources 98 such as one or a plurality of LED's or other suitable lighting means. A rechargeable or replaceable battery (not shown) may be employed to power the light source 98, and also includes an on/off switch.

Figure 19:
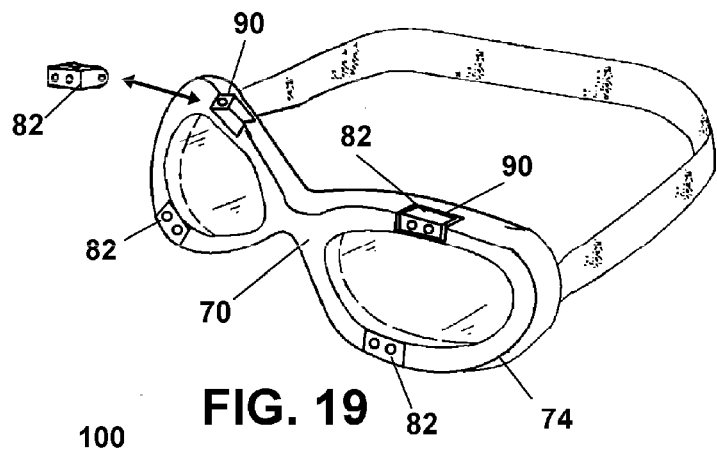
FIG. 19 shows yet another preferred mode depicting goggle hybrid type eyewear employing the system for removable engagement of illumination components.

FIG. 19 shows another mode of the device 10 employing the system for removable engagement of illumination incorporated into the frame 74 of a hybrid type goggle 70. The frame 74 will include one or a plurality of receiving cavities 90 as shown for removable engagement with the pod illumination components 82.

Figure 20:
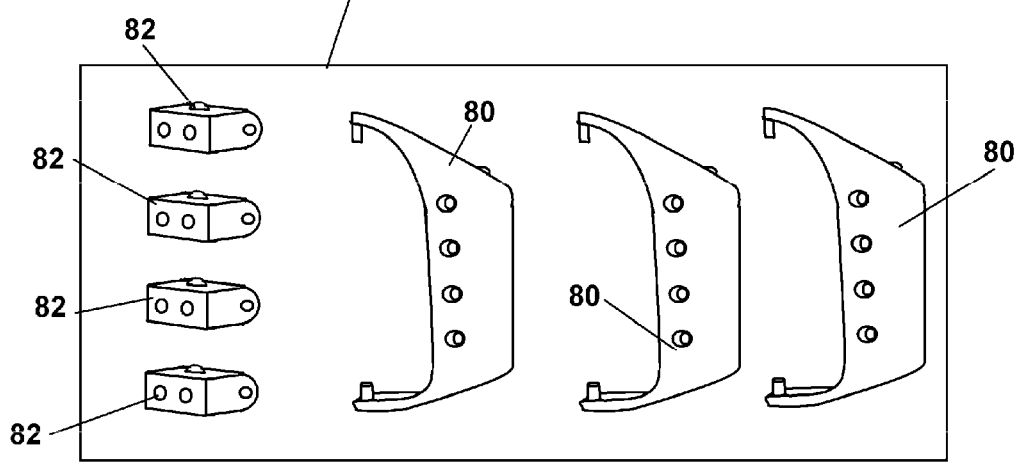
FIG. 20 shows a preferred kit mode of the device employing the system for removable engagement of illumination components.

In a particularly preferred kit mode shown in FIG. 20, a kit 100 is provided including a plurality of pod illumination components 82 and outrigger illumination components 80 which may have different light source 84 types and configurations allowing the user to select the desired one to meet their needs.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A system for engagement of electronic components with eyewear, comprising:
   one or a plurality of rails engaged with a frame of said eyewear, said frame extending between engagements at a respective first and second end of said frame, with a strap or temple;
   one or a plurality of electronic components each having a complimentary engagement component to said rail, whereby one or a plurality of said electronic components may be engaged with a said rail, and adjusted to a position thereon in between said first end and said second of said frame, once engaged.

2. The system of claim 1 wherein said electronic components are from a group including antennas, illumination components, supplemental power components, and electronic video capture and transmission components.

3. The system of claim 2 wherein said frame is a goggle frame surrounding a periphery edge of a lens; and
   said one or plurality of rails are engaged with said goggle frame adjacent to said peripheral edge.

4. The system of claim 2 wherein said frame is a bridge of eyeglasses; and
   said bridge engaged along a lower edge with a shield lens or with eyeglass lenses.

5. The system of claim 1 wherein said frame is a goggle frame surrounding a peripheral edge of a lens; and
   said one or plurality of rails are engaged with said goggle frame adjacent to said peripheral edge.

6. The system of claim 5 wherein said one or plurality of rails have ridges formed thereon; and
   said engagement component has a surface thereon complimentary to said ridges.

7. The system of claim 5 wherein said one or plurality of rails have are formed in the shape of an I-beam; and
   said engagement component has a surface thereon complimentary to said I-beam shape and is slidably engageable thereon.

8. The system of claim 5 wherein said one or plurality of rails have are formed as a slot depending into said frame; and
   said engagement component has a surface thereon complimentary a shape of said slot, and is slidably engageable therein.

9. The system of claim 1 wherein said frame is a bridge of eyeglasses; and
   said bridge engaged along a lower edge with a shield lens or with eyeglass lenses.

10. The system of claim 9 wherein said one or plurality of rails have ridges formed thereon; and said engagement component has a surface thereon complimentary to said ridges.

11. The system of claim 9 wherein said one or plurality of rails have are formed in the shape of an I-beam; and
said engagement component has a surface thereon complimentary to said I-beam shape and is slidably engageable thereon.

12. The system of claim 9 wherein said one or plurality of rails have are formed as a slot depending into said frame; and
said engagement component has a surface thereon complimentary a shape of said slot, and is slidably engageable therein.

13. The system of claim 1 wherein said one or plurality of rails have ridges formed thereon; and
said engagement component has a surface thereon complimentary to said ridges.

14. The system of claim 1 wherein said one or plurality of rails have are formed in the shape of an I-beam; and
said engagement component has a surface thereon complimentary to said I-beam shape and is slidably engageable thereon.

15. The system of claim 1 wherein said one or plurality of rails have are formed as a slot depending into said frame; and
said engagement component has a surface thereon complimentary a shape of said slot, and is slidably engageable therein.

* * * * *